(12) United States Patent
Katsuda et al.

(10) Patent No.: US 7,487,996 B2
(45) Date of Patent: Feb. 10, 2009

(54) SPACE-SAVING, HIGH-OUTPUT, MULTI-STAGE GAS GENERATOR

(75) Inventors: Nobuyuki Katsuda, Hyogo (JP); Mikio Yabuta, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 456 days.

(21) Appl. No.: 11/213,930

(22) Filed: Aug. 30, 2005

(65) Prior Publication Data

US 2006/0066087 A1      Mar. 30, 2006

(30) Foreign Application Priority Data

Sep. 30, 2004   (JP)   ................. 2004-287142

(51) Int. Cl.
*B60R 21/26*   (2006.01)
(52) U.S. Cl. ..................................... 280/741
(58) Field of Classification Search ........... 280/736, 280/741, 740

See application file for complete search history.

(56) References Cited

U.S. PATENT DOCUMENTS

| 5,033,390 | A |   | 7/1991  | Minert et al. |
|-----------|---|---|---------|---------------|
| 5,286,054 | A | * | 2/1994  | Cuevas ....................... 280/738 |
| 5,658,010 | A | * | 8/1997  | Steffens et al. .............. 280/731 |
| 6,142,519 | A | * | 11/2000 | Smith ......................... 280/741 |
| 6,168,200 | B1| * | 1/2001  | Greist et al. ................. 280/736 |
| 6,341,799 | B1|   | 1/2002  | Furusawa et al. ........... 280/736 |

FOREIGN PATENT DOCUMENTS

| JP | 3-175298 A  | 7/1991 |
|----|-------------|--------|
| JP | 10-181517 A | 7/1998 |
| JP | 11-139241 A | 5/1999 |

* cited by examiner

*Primary Examiner*—Christopher Ellis
*Assistant Examiner*—Joseph Rocca
(74) *Attorney, Agent, or Firm*—Birch, Stewart, Kolasch & Birch, LLP

(57) ABSTRACT

The present invention provides a small, high-output gas generator for an air bag. A filter 30 is disposed between a first gas generator 11 and a second gas generator 21. Gas discharged from the first gas generator 11 and gas discharged from the second gas generator 21 pass through the same filter 30, and are then discharged from a second gas discharge port 36 to inflate the air bag.

6 Claims, 2 Drawing Sheets

(a)                    (b)

(a)                    (b)

SPACE-SAVING, HIGH-OUTPUT, MULTI-STAGE GAS GENERATOR

TECHNICAL FIELD

The present invention relates to a multi-stage gas generator used in an air bag system for protecting passengers during a collision.

BACKGROUND ART

Air bags installed in vehicles such as automobiles have a wide range of applications such as bags for protecting the head region, chest, waist, and knees of a passenger, curtain bags provided on the side window, and so on. However, the space inside a vehicle is limited, and hence it is often impossible to install a gas generator for each application. Therefore, it is important to reduce the size of the gas generator so that a bag for use in a variety of applications can be inflated effectively in a limited space.

Furthermore, in recent years larger air bags than those of the past are used in lateral collision applications, and a gas generator having a large output is necessary to inflate such an air bag within the required time period.

In response to these two demands, ideas such as increasing the size of a conventional gas generator without altering its basic constitution, or simply combining a plurality of conventional gas generators, have been considered. With these methods, however, the required space-saving cannot be achieved.

JP-A 11-139241 discloses arranging a plurality of gas generators in parallel inside the steering wheel. U.S. Pat. No. 5,658,010 discloses arranging two cylindrical inflators in parallel. JP-A No. 10-181517 discloses a module in which a filter is disposed on the exterior of a filterless inflator. JP-A 03-175298 discloses an inflator in which two combustion chambers and a filter chamber are provided independently of each other.

DISCLOSURE OF THE INVENTION

The present invention provides a multi-stage gas generator for an air bag which is small, light, has a high output, and can be applied as a gas generator for use with various types of air bags.

As means for achieving this object, the present invention provides a multi-stage gas generator for an air bag, comprising a combination of a plurality of filterless gas generators, each having a first gas discharge port, and an external filter, a space, which includes the filter and a plurality of the first gas discharge ports provided in each of the plurality of gas generators, being surrounded by a housing having a second gas discharge port, and gas, that is discharged from the first gas discharge ports of the plurality of gas generators, passing through the filter, then being discharged from the second gas discharge port to inflate the air bag.

By combining a plurality of gas generators, a high overall output can be achieved, and by using a single filter for the plurality of gas generators, a reduction in the overall size can be achieved. As a result, the gas generator can be disposed in a small space in the interior of the vehicle, and can also be applied to an air bag that requires a high output (an air bag for lateral collisions or the like).

The multi-stage gas generator for an air bag according to the present invention may comprise a combination of two cylindrical, filterless gas generators, each having a first gas discharge port, and an external filter, the two cylindrical gas generators having a plurality of the first gas discharge ports which are arranged in an axial direction in the respective peripheral surfaces thereof, and the respective first gas discharge ports being arranged parallel to face each other, a filter, which has a substantially V-shaped cross-section in the width direction and a length equal to or greater than the axial length of at least the plurality of first gas discharge ports, being disposed between the two gas generators, and a housing, which has a second gas discharge port, being provided to surround all of the plurality of first gas discharge ports in the two gas generators and the filter.

The length of this multi-stage gas generator is greater than the width, and similarly to the invention described above, a single filter is used for the plurality of gas generators. Therefore, a high output can be achieved, and overall reductions in size and weight can be achieved in relation to the output.

The multi-stage gas generator for an air bag according to the present invention may comprise a combination of two disk-form, filterless gas generators, each having a first gas discharge port, and an external filter, the two disk-form gas generators each having a plurality of the first gas discharge ports which are arranged in a circumferential direction in the respective peripheral surfaces thereof, and the respective first gas discharge ports being arranged parallel to face each other, a cylindrical filter being disposed between the two gas generators, and a housing, which has a second gas discharge port, being provided to surround all of the plurality of first gas discharge ports in the two gas generators and the filter.

In the present invention, the term "disk-form" signifies a low columnar form having a certain degree of thickness, rather than a disk form having no thickness.

The width of this multi-stage gas generator is greater than the height, and similarly to the invention described above, a single filter is used for the plurality of gas generators. Therefore, a high output can be achieved, and overall reductions in size and weight can be achieved in relation to the output.

In the multi-stage gas generator for an air bag according to the present invention, air bag inflating means may use only the combustion gas of a gas generating agent (i.e. a pyrotechnic inflator), only gas (argon, helium, nitrogen gas, or similar) charged at high pressure (i.e. a hybrid inflator), or both combustion gas and gas charged at high pressure.

Well-known substances may be used as the gas generating agent and gas. Moreover, an inflator (gas generator) which uses either type of inflating means comprises an electric igniter (comprising an ignition charge) as means for igniting the gas generating agent or to rupture a rupturable plate behind which the high-pressure gas is charged densely.

The multi-stage gas generator of the present invention is small and light in relation to the magnitude of its output, and is therefore suitable for application to an air bag (a lateral collision air bag or the like) which is disposed in a small space in the interior of a vehicle but requires a high output.

Figure 1:
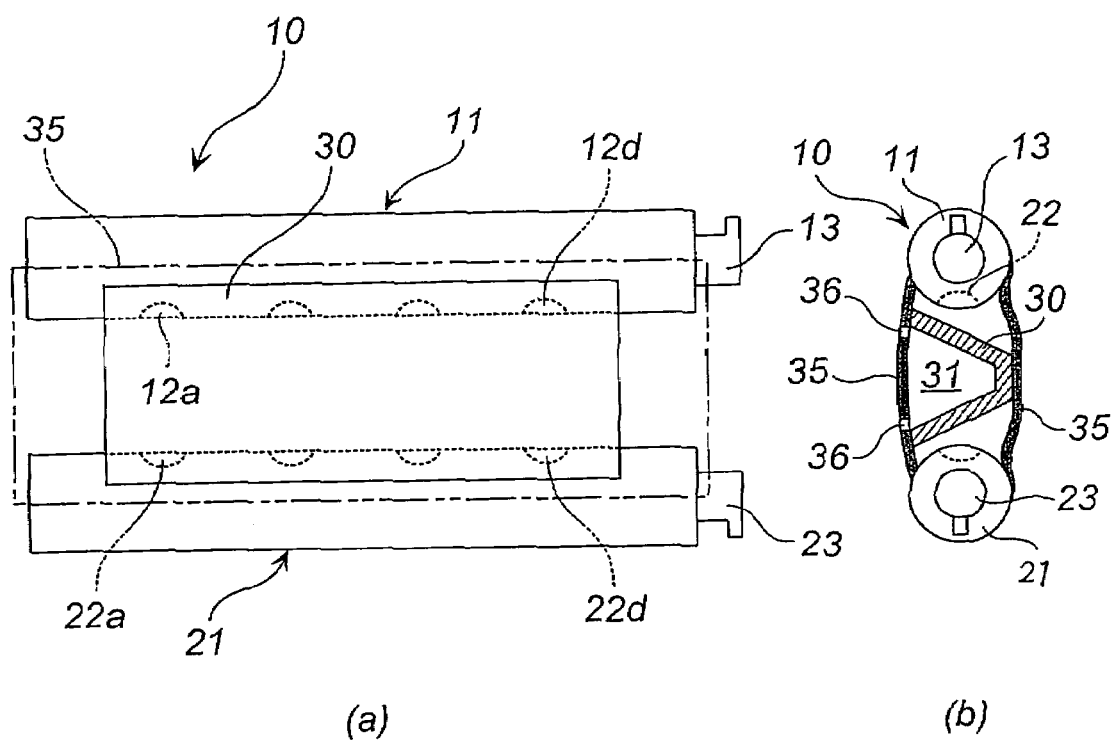
FIG. 1(a) is a schematic plan view of a multi-stage gas generator.
FIG. 1(b) is a front view of FIG. 1(a)

REFERENCE NUMERALS OF THE DRAWINGS ARE 10, 50 gas generator (inflator)
11, 51 first gas generator
12, 62 second gas generator
12a, 51a 1a gas discharge port
22a, 52a 1b gas discharge port
30, 70 filter
35, 75 housing
36, 76 second gas discharge port

DESCRIPTION OF THE PREFERRED EMBODIMENTS (1) First Embodiment

A first embodiment will be described using FIG. 1. FIG. 1(a) is a schematic plan view of a multi-stage gas generator, in which the dot-dot-dash line is an imaginary line and the broken lines indicate parts that cannot be seen. FIG. 1(b) is a front view of the multi-stage gas generator, in which the broken lines indicate parts that cannot be seen. In FIG. 1(b), a filter 30 and a housing 35 alone are illustrated in sectional form.

As shown in FIG. 1(b), gas discharge ports are provided with opening holes in a wall, but in FIG. 1(a), for convenience and to clearly illustrate formation positions, the gas discharge ports are illustrated in a slightly modified form.

A multi-stage gas generator 10 comprises a first gas generator 11 and a second gas generator 21. The first gas generator 11 and second gas generator 21 themselves are well-known apparatuses accommodating a desired means for inflating an air bag. The outer shell container thereof (usually referred to as a housing, shell, or the like) is selected according to the air bag inflating means, and is made of metal (aluminum, stainless steel, steel, or similar).

The first gas generator 11 has a plurality of 1a gas discharge ports 12 (12a etc.) disposed at fixed intervals in the axial direction of the peripheral surface of the first gas generator 11, and a first electric igniter 13 is mounted on one end face of the first gas generator 11. The second gas generator 21 has a plurality of 1b gas discharge ports 22 (22a etc.) disposed at fixed intervals in the axial direction of the peripheral surface of the second gas generator 21, and a second electric igniter 23 is mounted on one end face of the second gas generator 21. The 1a gas discharge ports 12 and 1b gas discharge ports 22 may be sealed with aluminum or stainless steel tape.

The first gas generator 11 and second gas generator 21 are arranged parallel to each other such that the 1a gas discharge ports 12 and 1b gas discharge ports 22 face each other directly, and such that the length range of the respective gas discharge ports in the axial direction match each other (in other words, such that the 1a gas discharge port 12a directly faces the 1b gas discharge port 22a, and the 1a gas discharge port 12d directly faces the 1b gas discharge port 22d).

The filter 30 is disposed between the two gas generators 11, 21. A well-known filter can be used as the filter 30. In the case of a pyrotechnic inflator, the filter 30 functions as a coolant/filter having functions of cooling and filtering combustion gas, and in the case of a hybrid inflator, the filter 30 traps pieces of broken rupturable plate.

The filter 30 has a substantially V-shaped cross-section in the widthwise direction, and the length thereof is equal to or greater than the axial length of at least the plurality of first gas discharge ports 12, 22 (i.e. the length from the 1a gas discharge port 12a to the 1a gas discharge port 12d, or the length from the 1a gas discharge port 22a to the 1a gas discharge port 22d).

A housing 35 is provided to surround all of the plurality of 1a gas discharge ports 12 and 1b gas discharge ports 22 of the two gas generators 11, 21, and the filter 30. The interior of the housing 35 does not communicate with the external atmosphere.

The housing 35 has a plurality of second gas discharge ports 36. The second gas discharge ports 36 may be sealed by aluminum or stainless steel tape. An air bag is attached to cover at least the second gas discharge ports 36.

The housing 35 and the two gas generators 11, 21 are fixed to each other by welding together respective contact surfaces thereof. The filter 30 is held by the housing 35 to be clamped from above and below.

A member (short pass prevention member) for preventing "short pass", in which gas leaks out from a contact portion between the filter 30 and housing 35 and is discharged from the second gas discharge ports 36 without passing through the filter 30, may be disposed in this contact portion. The short pass prevention member may employ a typical member used in known inflators.

Next, an operation of the multi-stage gas generator will be described. The two igniters 13, 23 may be activated simultaneously, at a time difference, or singularly (note, however, that in this case, the other igniter is activated at a time difference that does not contribute to inflation of the air bag to ensure operational safety when dismantling the gas generator) In the following, however, a case in which the two igniters 13, 23 are activated at a time difference will be described.

First, upon activation of the first igniter 13, gas serving as an air bag inflating medium is discharged from the 1a gas discharge ports 12 of the first gas generator 11. The gas passes through the filter 30, flows into a space 31, and is then discharged from the second gas discharge ports 36 to inflate the air bag. By means of the space 31, the filter 30 does not contact the second gas discharge ports 36, and the gas is discharged after initially flowing into the space 31. As a result, the gas is discharged evenly from the plurality of second gas discharge ports 36.

After a slight delay, the second igniter 23 is activated, whereby gas serving as an air bag inflating medium is discharged from the 1b gas discharge ports 22 of the second gas generator 21. The gas passes through the filter 30, flows into the space 31, and is then discharged from the second gas discharge ports 36 to further inflate the air bag.

Since the multi-stage gas generator 10 comprises the two gas generators 11, 21, its output can be increased greatly, and since the two gas generators 11, 21 share the single filter 30, the overall size and weight of the multi-stage gas generator 10 can be reduced.

(2) Second Embodiment

Figure 2:
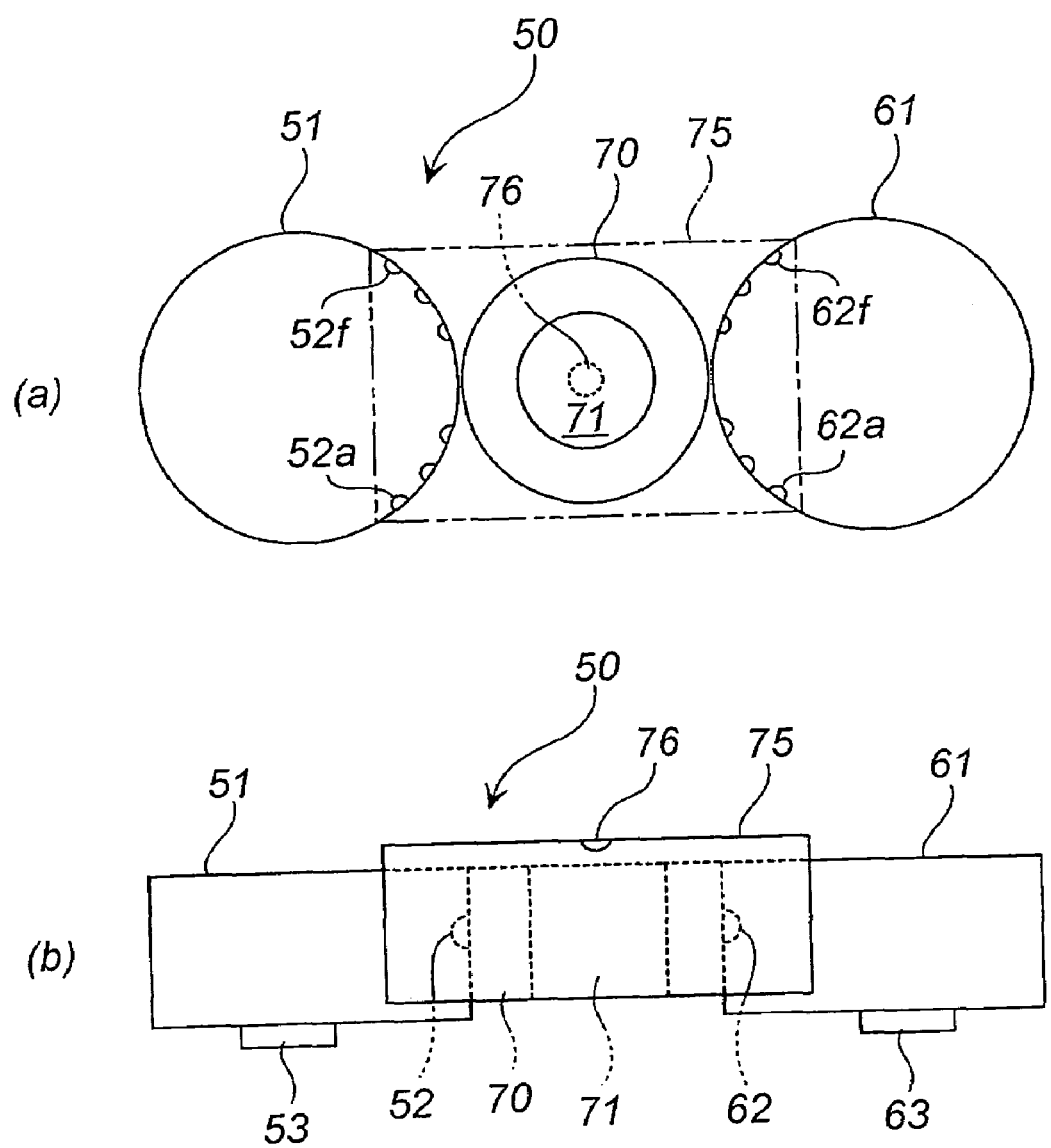
FIG. 2(a) is a plan view of a multi-stage gas generator.
FIG. 2(b) is a front view of FIG. 2(a).

A second embodiment will be described using FIG. 2. FIG. 2(a) is a schematic plan view of a multi-stage gas generator in which the dot-dot-dash line is an imaginary line. FIG. 2(b) is a front view of the multi-stage gas generator in which the broken lines indicate parts that cannot be seen.

As shown in FIG. 1(b), gas discharge ports are formed by opening holes in a wall, but in FIGS. 2(a) and 2(b), for convenience and to clearly illustrate formation positions, the gas discharge ports are illustrated in a slightly modified form.

A multi-stage gas generator 50 comprises a first gas generator 51 and a second gas generator 61. The first gas generator 51 and second gas generator 61 themselves are well-known apparatuses accommodating desired means for inflating an air bag. The outer shell container thereof (usually referred to as a housing, shell, or the like) is selected according to the air bag inflating means, and is made of metal (aluminum, stainless steel, steel, or similar).

The first gas generator 51 has a plurality of 1a gas discharge ports 52 (52a etc.) in the circumferential direction of the peripheral surface of the first gas generator 51, and a first electric igniter (53 denotes a connector connected to the igniter) is mounted on a bottom face side of the first gas generator 51. The second gas generator 61 has a plurality of 1b gas discharge ports 62 (62a etc.) in the circumferential direction of the peripheral surface of the second gas generator 61, and a second electric igniter (63 denotes a connector connected to the igniter) is mounted on a bottom face of the second gas generator 61. The 1a gas discharge ports 52 and 1b gas discharge ports 62 may be sealed with aluminum or stainless steel tape.

The first gas generator 51 and second gas generator 61 are arranged parallel to each other such that the 1a gas discharge ports 52 and 1b gas discharge ports 62 face each other, and such that the length range of the respective gas discharge ports in the circumferential direction match each other (in other words, such that the 1a gas discharge port 52a faces the 1b gas discharge port 62a, and the 1a gas discharge port 52f faces the 1b gas discharge port 62f).

A cylindrical filter 70 is disposed between the two gas generators 51, 61. A well-known filter can be used as the filter 70. In the case of a pyrotechnic inflator, the filter 70 functions as a coolant/filter having functions of cooling and filtering combustion gas, and in the case of a hybrid inflator, the filter 70 traps pieces of broken rupturable plate.

A housing 75 is provided to surround all of the plurality of 1a gas discharge ports 52 and 1b gas discharge ports 62 of the two gas generators 51, 61, and the filter 70. The interior of the housing 75 does not communicate with the external atmosphere.

The housing 75 has a second gas discharge port 76. The second gas discharge port 76 is provided in a position directly facing a hollow portion of the cylindrical filter 70 in the housing 75, and may be provided singularly or in a plurality. The second gas discharge port 76 may be sealed by aluminum or stainless steel tape. An air bag is attached to cover at least the second gas discharge port 76.

The housing 75 and the two gas generators 51, 61 are fixed to each other by welding together respective contact surfaces thereof. The filter 70 is held by the housing 75 so as to be clamped from above and below.

A member (short pass prevention member) for preventing "short pass", in which gas leaks out from a contact portion between the filter 70 and housing 75 and is discharged from the second gas discharge port 76 without passing through the filter 70, may be disposed in this contact portion. The short pass prevention member may employ a typical member used in known inflators.

Next, similarly to the first embodiment, a case in which the two igniters are activated at a time difference will be described.

First, upon activation of the first igniter, gas serving as an air bag inflating medium is discharged from the 1a gas discharge ports 52 of the first gas generator 51. The gas passes through the filter 70, flows into a space (the hollow portion of the filter 70) 71, and is then discharged from the second gas discharge port 76 to inflate the air bag. By means of the space 71, the filter 70 does not contact the second gas discharge port 76, and the gas is discharged after initially flowing into the space 71. As a result, the gas is discharged evenly from the plurality of second gas discharge ports 76.

After a slight delay, the second igniter is activated, whereby gas serving as an air bag inflating medium is discharged from the 1b gas discharge ports 62 of the second gas generator 61. The gas passes through the filter 70, flows into the space 71, and is then discharged from the second gas discharge port 76 to further inflate the air bag.

Since the multi-stage gas generator 50 comprises the two gas generators 51, 61, its output can be increased greatly, and since the two gas generators 51, 61 share the single filter 70, the overall size and weight of the multi-stage gas generator 50 can be reduced.

The invention claimed is:

1. A multi-stage gas generator for an air bag, comprising:
   a combination of a first filterless gas generator provided with a first gas discharge port, and a second filterless gas generator provided with a second gas discharge port;
   an external filter provided between the first filterless gas generator and the second filterless gas generator; and
   a space, which includes the external filter, the first gas discharge port, and the second gas discharge port, being surrounded by a housing having a third gas discharge port, wherein
   gas, that is discharged from the first gas discharge port and the second gas discharge port passes through the external filter, then discharged from the third gas discharge port to inflate the air bag.

2. The multi-stage gas generator for an air bag according to claim 1,
   wherein the first filterless gas generator and the second filterless gas generator are cylindrical and include a plurality of the first gas discharge ports and the second gas discharge ports which are arranged in an axial direction in respective peripheral surfaces thereof, such that the plurality of first gas discharge ports and the second gas discharge ports are arranged parallel to face each other,
   wherein the external filter has a substantially V-shaped cross-section in the width direction and a length equal to or greater than an axial length of the plurality of first gas discharge ports and the second gas discharge ports, and
   wherein the housing is provided to surround all of the plurality of first gas discharge ports and the second gas discharge ports and the external filter.

3. The multi-stage gas generator for an air bag according to claim 2, wherein the combination uses only the combustion gas of a gas generating agent, only gas charged at high pressure, or both combustion gas and gas charged at high pressure.

4. The multi-stage gas generator for an air bag according to claim 2, wherein the external filter includes a first inclined side wall and a second inclined side wall connected to each other at a bottom thereof and defines an inner space within the housing such that the third gas discharge port fluidly connecting the inner space with an outside of the housing.

5. The multi-stage gas generator for an air bag according to claim 1, comprising a combination of two disk-form, filterless gas generators, each having a first gas discharge port, and an external filter,
   the two disk-form gas generators each having a plurality of the first gas discharge ports which are arranged in a circumferential direction in the respective peripheral surfaces thereof, and the respective first gas discharge ports being arranged parallel to face each other,
   a cylindrical filter being disposed between the two gas generators, and
   a housing, which has a second gas discharge port, being provided to surround all of the plurality of first gas discharge ports in the two gas generators and the filter.

6. The multi-stage gas generator for an air bag according to claim 1, wherein the combination uses only the combustion gas of a gas generating agent, only gas charged at high pressure, or both combustion gas and gas charged at high pressure.

* * * * *